(12) United States Patent
Zhu et al.

(10) Patent No.: US 11,038,257 B2
(45) Date of Patent: Jun. 15, 2021

(54) ANTENNA STRUCTURE AND COMMUNICATIONS TERMINAL

(71) Applicant: Huawei Technologies Co., Ltd., Shenzhen (CN)

(72) Inventors: Wei Zhu, Shenzhen (CN); Yi Wang, Xi'an (CN); Kun Li, Xi'an (CN); Silei Huyan, Xi'an (CN); Yun Zhang, Xi'an (CN); Bao Lu, Shenzhen (CN); Shiqiang Lu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/478,351

(22) PCT Filed: Jul. 4, 2017

(86) PCT No.: PCT/CN2017/091699
§ 371 (c)(1),
(2) Date: Jul. 16, 2019

(87) PCT Pub. No.: WO2018/129877
PCT Pub. Date: Jul. 19, 2018

(65) Prior Publication Data
US 2019/0372201 A1    Dec. 5, 2019

(30) Foreign Application Priority Data
Jan. 16, 2017    (CN) .......................... 201710038272.4

(51) Int. Cl.
*H01Q 1/24*    (2006.01)
*H01Q 5/335*    (2015.01)
(Continued)

(52) U.S. Cl.
CPC ............... *H01Q 1/243* (2013.01); *H01Q 1/48* (2013.01); *H01Q 1/521* (2013.01); *H01Q 5/335* (2015.01)

(58) Field of Classification Search
CPC ............ H01Q 5/35; H01Q 5/50; H01Q 5/335; H01Q 1/00; H01Q 13/10; H01Q 2/24; H01Q 2/28; H01Q 2/30; H01Q 9/16
See application file for complete search history.

(56) References Cited

U.S. PATENT DOCUMENTS 9,537,983 B2 * 1/2017 Lee ..................... H01Q 1/243
9,621,230 B2 * 4/2017 Ouyang .................. H01Q 5/35
(Continued)

FOREIGN PATENT DOCUMENTS

CN    103682619 A    3/2014
CN    203708295 U    7/2014
(Continued)

OTHER PUBLICATIONS

Machine Translation and Abstract of Chinese Publication No. CN103682619, Mar. 26, 2014, 8 pages.
(Continued)

*Primary Examiner* — Crystal L Hammond
(74) *Attorney, Agent, or Firm* — Conley Rose, P.C.

(57) ABSTRACT

A communications terminal includes an antenna structure and a metallic frame that includes at least one slot. The antenna structure includes an NFC antenna and a non-NFC antenna. The NFC antenna includes an NFC radiator, a first filtering unit, and an NFC circuit, and the non-NFC antenna includes a non-NFC radiator, a second filtering unit, and a non-NFC circuit. The NFC radiator and the non-NFC radiator are formed by the metallic frame of the communications terminal, and the entire non-NFC radiator is in the NFC radiator. The NFC circuit is coupled to the NFC radiator by (Continued)

using the first filtering unit, the non-NFC circuit is coupled to the non-NFC radiator by using the second filtering unit, the first filtering unit is configured to filter out a non-NFC signal, and the second filtering unit is configured to filter out an NFC signal.

20 Claims, 7 Drawing Sheets

(51) Int. Cl.
*H01Q 1/48* (2006.01)
*H01Q 1/52* (2006.01)

(56) References Cited

U.S. PATENT DOCUMENTS

| | | | |
|---|---|---|---|
| 9,935,359 B2 * | 4/2018 | Kim | H01Q 1/243 |
| 10,256,526 B2 * | 4/2019 | Lee | H01Q 1/243 |
| 2014/0139380 A1 | 5/2014 | Ouyang et al. | |
| 2015/0249292 A1 * | 9/2015 | Ouyang | H01Q 1/48 343/702 |
| 2015/0249485 A1 | 9/2015 | Ouyang et al. | |
| 2016/0112096 A1 | 4/2016 | Zhao et al. | |
| 2016/0197401 A1 | 7/2016 | Ouyang et al. | |
| 2016/0218422 A1 | 7/2016 | Choi et al. | |
| 2016/0380337 A1 | 12/2016 | Lee et al. | |
| 2017/0085301 A1 | 3/2017 | Chen et al. | |

FOREIGN PATENT DOCUMENTS

| | | | |
|---|---|---|---|
| CN | 104425885 A | 3/2015 | |
| CN | 104426583 A | 3/2015 | |
| CN | 204441452 U | 7/2015 | |
| CN | 104953289 A | 9/2015 | |
| CN | 204760528 U | 11/2015 | |
| CN | 105514624 A | 4/2016 | |
| CN | 205211941 U | 5/2016 | |
| CN | 105940550 A | 9/2016 | |
| CN | 105940554 A | 9/2016 | |
| CN | 106252828 A | 12/2016 | |
| CN | 106299677 A | 1/2017 | |
| CN | 106299678 A | 1/2017 | |
| CN | 106450744 A | 2/2017 | |
| CN | 104953240 B | 4/2019 | |
| EP | 2618497 A1 | 7/2013 | |
| JP | 2010128569 A | 6/2010 | |

OTHER PUBLICATIONS

Machine Translation and Abstract of Chinese Publication No. CN104953289, Sep. 30, 2015, 15 pages.
Machine Translation and Abstract of Chinese Publication No. CN105514624, Apr. 20, 2016, 13 pages.
Machine Translation and Abstract of Chinese Publication No. CN106252828, Dec. 21, 2016, 36 pages.
Machine Translation and Abstract of Chinese Publication No. CN106299678, Jan. 4, 2017, 14 pages.
Machine Translation and Abstract of Chinese Publication No. CN106450744, Feb. 22, 2017, 10 pages.
Machine Translation and Abstract of Chinese Publication No. CN203708295, Jul. 9, 2014, 11 pages.
Machine Translation and Abstract of Chinese Publication No. CN204441452, Jul. 1, 2015, 16 pages.
Machine Translation and Abstract of Japanese Publication No. JP2010128569, Jun. 10, 2010, 43 pages.
Foreign Communication From a Counterpart Application, Chinese Application No. 201780004635.0, Chinese Office Action dated Oct. 8, 2019, 10 pages.
Foreign Communication From a Counterpart Application, PCT Application No. PCT/CN2017/091699, English Translation of International Search Report dated Oct. 13, 2017, 2 pages.
Foreign Communication From a Counterpart Application, PCT Application No. PCT/CN2017/091699, English Translation of Written Opinion dated Oct. 13, 2017, 3 pages.
Guo-Jun, O., "Design method of UHF RFID tag antenna against interference from mobile communication terminal," Modern Electronics Technique, vol. 37, No. 9, May 2014, 7 pages.

* cited by examiner

FIG. 1

PRIOR ART

ANTENNA STRUCTURE AND COMMUNICATIONS TERMINAL

This application is a U.S. National Stage application of International Application No. PCT/CN2017/091699, filed on Jul. 4, 2017, which claims priority to Chinese Patent Application No. 201710038272.4, filed on Jan. 16, 2017. Both of the aforementioned applications are hereby incorporated by reference in their entireties.

TECHNICAL FIELD

This application relates to the field of wireless communications antennas, and specifically, to an antenna structure and a communications terminal.

BACKGROUND

In mobile communications, there are usually three important components: a communications terminal, a base station, and a radio network. Making a phone call is used as an example. When a user talks by using a communications terminal, a communications terminal of a calling party converts speech into a radio wave, a base station near the communications terminal of the calling party receives the radio wave and transmits the radio wave to a base station near a called party by using a radio network, then the base station near the called party transmits the radio wave to a communications terminal of the called party, and the communications terminal converts the radio wave into speech and transmits the speech to a user of the called party. In this process, an antenna in the communications terminal plays a role of transmitting and receiving the radio wave transmitted between the communications terminal and the base station.

A radio wave used in mobile communications is an electromagnetic wave, and different electromagnetic waves have different wavelengths. For example, a frequency of an electromagnetic wave transmitted/received by a conventional communications terminal usually falls within a range of 800 MHz to 2100 MHz. A wavelength corresponding to a frequency of 800 MHz is approximately 370 mm, while a wavelength corresponding to a frequency of 2100 MHz is approximately 140 mm. In other words, the wavelength is inversely proportional to the frequency. A specialized international organization divides frequency resources into different frequency bands. One frequency band includes a specific frequency range, and the frequency band is named by an intermediate value of the frequency range. For example, a frequency range of 824 MHz to 894 MHz is named 850 MHz frequency hand, Each frequency band is further divided into a transmit frequency sub-band and a receive frequency sub-band. A size of an antenna is closely related to a wavelength of an electromagnetic wave transmitted/received by the antenna. Persons skilled in the art usually set a length of the antenna to half or one-fourth of the wavelength of the transmitted/received electromagnetic wave. For example, for an electromagnetic wave in an 850 MHz frequency band, an ideal minimum antenna length is 9 cm. A longer wavelength indicates a larger antenna length required.

To adapt to user requirements for portability and appearance of a communications terminal, the communications terminal is getting increasingly thin. As a result, a larger limitation is imposed on an antenna design for the communications terminal. At present, communications terminals generally use a metallic frame design. The metallic frame acts as a radiator of the antenna to implement a function of the antenna. This helps reduce a thickness of the communications terminal.

Figure 1:
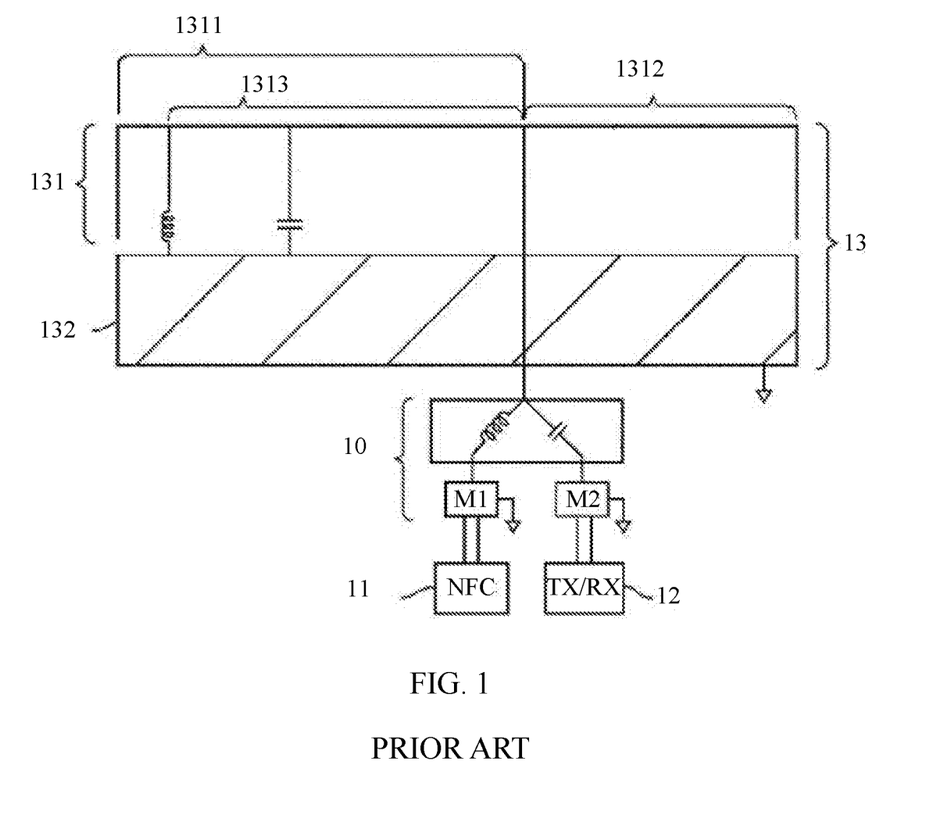
FIG. 1 is a diagram of an example of an existing antenna structure.

To facilitate user life, current communications terminals, in particular, mobile phones, need to implement a plurality of functions, such as mobile payment, identification, e-ticketing, and anti-counterfeiting. To implement these functions, mobile phones need to have a short-range communication function. NFC is a short-range non-contact communication mode, with an effective communication distance generally within 0.1 m, an operating frequency of 13.65 MHz, and a communication rate between 106 kbit/s and 848 kbit/s. NFC communication always includes an initiator and a receiver. Compared with other short-range wireless communications technologies (for example, Bluetooth (Bluetooth) and infrared), the NFC has such advantages as high communication security, fast response, and low costs. Therefore, the NFC function is a necessity for communications terminals, for example, mobile phones. In addition, to save design space of a communications terminal, integrating an NFC antenna with other antennas with various communications functions is a trend. For example, FIG. 1 shows a design in which the NFC antenna is completely or partially integrated with a non-NFC antenna. However, in the design process, NFC performance during implementation of the NFC function needs to be considered. The NFC performance greatly depends on a magnetic flux generated by the NFC antenna. A magnetic flux calculation formula is shown as the following formula (1):

$$\Phi = BS \qquad \text{Formula (1)},$$

where
$\Phi$ is a magnetic flux, B is magnetic induction intensity, S is a curve surface, a value of B depends on a current, and a value of S is positively correlated with an antenna size (that is, a length of an antenna radiator).

FIG. 1 is a diagram of an example of an existing antenna structure. An antenna combination circuit 10 is connected to an NFC circuit 11 and a non-NFC circuit 12, the antenna combination circuit 10 is coupled to an antenna feeding port of an antenna unit 13, the antenna unit 13 includes an inverted-F antenna resonant element 131 and an antenna grounding portion 132, the inverted-F antenna resonant element 131 includes a resonant element arm 1311 and a resonant element arm 1312, the inverted-F antenna resonant element 131 is used as a radiator of a non-NFC antenna, and a portion 1313 of the resonant element arm 1311 is used as a radiator of the NFC antenna. Because the radiator of the NFC antenna is a portion of the radiator of the non-NFC antenna in FIG. 1, a length of the radiator of the NFC antenna is inevitably restricted by the non-NFC antenna. Consequently, the magnetic flux $\Phi$ is also restricted and the NFC performance of the communications terminal is restricted.

SUMMARY

This application provides an antenna structure and a communications terminal, to improve NFC performance of a communications terminal.

A first aspect of this application provides an antenna structure, applied to a communications terminal, where the communications terminal includes a metallic frame, the metallic frame includes at least one slot, and the antenna structure includes:

an NFC antenna and a non-NFC antenna, where the NFC antenna includes an NFC radiator, a first filtering unit, and an NFC circuit, and the non-NFC antenna includes a non-NFC radiator, a second filtering unit, and a non-NFC circuit;

the NFC radiator and the non-NFC radiator are formed by the metallic frame of the communications terminal, and the entire non-NFC radiator is in the NFC radiator; and the NFC circuit is coupled to the NFC radiator by using the first filtering unit, the non-NFC circuit is coupled to the non-NFC radiator by using the second filtering unit, the first filtering unit is configured to filter out a non-NFC signal generated by the non-NFC circuit, and the second filtering unit is configured to filter out an NFC signal generated by the NFC circuit.

In a possible design, the non-NFC antenna includes a grounding path, one end of the grounding path is connected to the ground, the other end of the grounding path is electrically connected to the metallic frame, and the grounding path includes a capacitor or a high-pass circuit.

In a possible design, the capacitor has a capacitance value greater than 30 picofarads.

In a possible design, a length of the non-NFC radiator is less than one-fourth of a length of the NFC radiator.

In a possible design, a length of the NFC radiator is greater than one-fourth of a length of the metallic frame.

In a possible design the NFC antenna includes a grounding point, and the grounding point and the NFC circuit form a single-end feeding mode.

In a possible design, the NFC circuit includes a balun circuit.

In a possible design, the NFC antenna includes a second feeding circuit, and the second feeding circuit and the NFC circuit form a double-end feeding mode.

In a possible design, the NFC antenna further includes:
an NFC matching circuit, configured to adjust impedance, where
the NFC matching circuit is connected in series between the NFC circuit and the first filtering unit.

In a possible design, the first filtering unit is an inductor or a low-pass circuit, and the second filtering unit is a capacitor or a high-pass circuit.

In a possible design, the non-NFC antenna includes a primary antenna, a diversity antenna, a GPS antenna, or a Wi-Fi antenna.

A second aspect of this application provides a communications terminal, where the communications terminal includes a printed circuit board disposed in the communications terminal, and the antenna structure according to any one of the foregoing possible designs.

In a possible design, the communications terminal further includes a metallic front housing, where
the metallic front housing acts as the ground wire and is connected to the grounding point of the NFC antenna.

In a possible design, the communications terminal further includes a non-metallic battery cover, and the non-metallic battery cover is connected to the metallic frame.

In a possible design, the communications terminal further includes a metallic battery cover, and there is a non-metallic substance layer between the metallic battery cover and the metallic frame.

In a possible design, the communications terminal further includes a metallic battery cover, there is a non-metallic substance layer between the metallic battery cover and the NFC radiator portion of the metallic frame, and the metallic battery cover is connected to other portions of the metallic frame.

At present, communications terminals generally use a metallic frame design. The metallic frame acts as a radiator of an antenna to implement a non-NFC function and an NFC function required by the communications terminal, so as to achieve a purpose of reducing a thickness of the communications terminal. The communications terminal in this application uses a metallic frame, and the metallic frame has at least one slot. The antenna structure includes an NFC antenna and a non-NFC antenna, the NFC antenna includes an NFC radiator, a first filtering unit, and an NFC circuit, and the non-NFC antenna includes a non-NFC radiator, a second filtering unit, and a non-NFC circuit. The NFC radiator and the non-NFC radiator are formed by the metallic frame of the communications terminal, and the entire non-NFC radiator is in the NFC radiator. The NFC circuit is coupled to the NFC radiator by using the first filtering unit, and the non-NFC circuit is coupled to the non-NFC radiator by using the second filtering unit. Because the first filtering unit is configured to filter out a non-NFC signal generated by the non-NFC circuit, the NFC radiator can emit an NFC signal; because the second filtering unit is configured to filter out an NFC signal generated by the NFC circuit, the non-NFC radiator can emit a non-NFC signal. Compared with the example in FIG. 1, a length of the NFC radiator according to this application is not restricted by the non-NFC radiator. Therefore, this application increases the length of the radiator of the NFC antenna, and further improves NFC performance of the communications terminal.

DESCRIPTION OF EMBODIMENTS

In order to enable persons skilled in the art to better understand the solutions in this application, the following describes this application in more detail with reference to the accompanying drawings and specific implementations. Apparently, the described embodiments are merely some but not all of the embodiments of this application.

Figure 2:
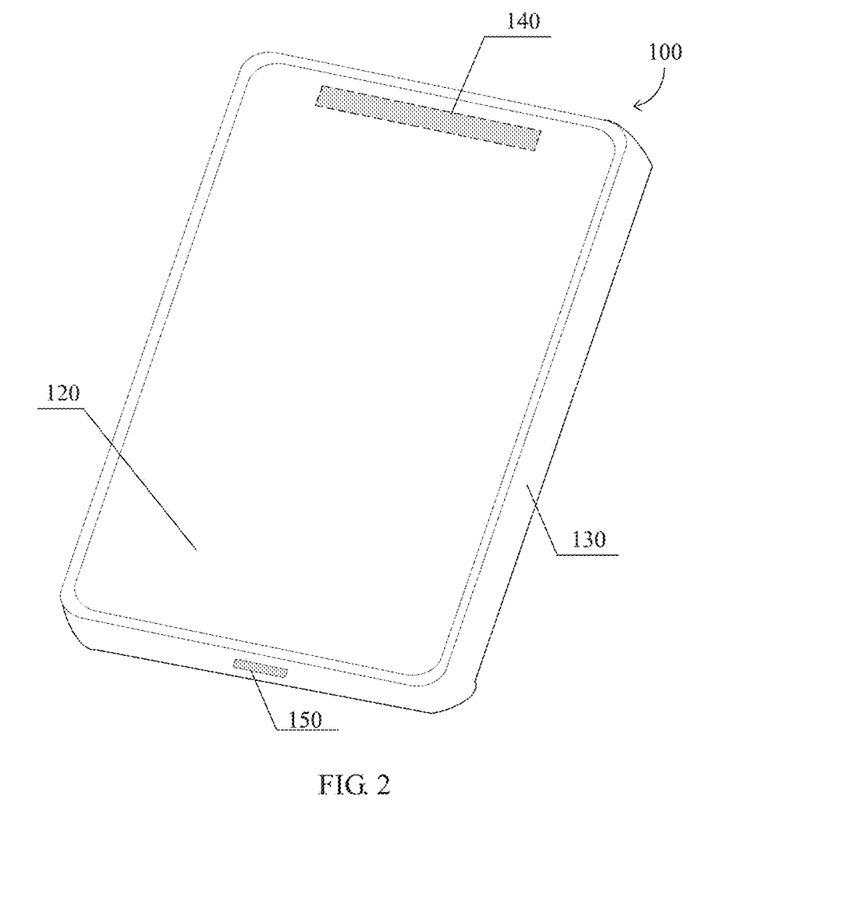
FIG. 2 is a schematic diagram of an exterior structure of a communications terminal according to an embodiment of the present invention.

Referring to FIG. 2, FIG. 2 is a schematic diagram of an exterior structure of a communications terminal according to an embodiment of the present invention. The communications terminal in the present invention includes a mobile phone, a tablet computer, a laptop computer, a router, a home gateway, a set-top box, an in-vehicle device, or the like. The term "communications terminal" in this specification may be replaced with such term as a terminal product, an electronic device, a communications product, a handheld terminal, a portable terminal, or the like.

For example, the communications terminal 100 has a cube-like shape, and includes a front cover 120, a side frame 130, and a back cover (not shown in FIG. 2). The side frame 130 may be divided into an upper side frame, a lower side frame, a left side frame, and a right side frame. These side frames are connected to each other, forming an arc at the joints. A button, a card tray cover, a speaker opening, a USB port, an earphone jack, a microphone port, and the like may be provided on the side frame. FIG. 2 illustratively shows a USB port 150 provided on the lower side frame. A screen, a button area, and the like may be provided on the front cover 120. A speaker opening 140 provided on the front cover and near the upper side frame is illustratively drawn in FIG. 2.

The communications terminal 100 includes a baseband processing circuit and a radio frequency communications circuit. The radio frequency communications circuit may be used to support radio communication in a plurality of radio frequency communications frequency bands. A radio frequency communications frequency band includes a Long Term Evolution (Long Term Evolution, LTE) frequency band, for example, 704 MHz-716 MHz, 1700 MHz-1755 MHz, and 1850 MHz-1900 MHz; a Global System for Mobile Communications (Global System for Mobile Communications, GSM) frequency band, for example, 824 MHz-849 MHz; a Wideband Code Division Multiple Access (Wideband Code Division Multiple Access, WCDMA) frequency band, for example, 1920 MHz-1980 MHz, and the like. Different radio frequency communications frequency bands are corresponding to different radio frequency communications circuits, for example, a GSM circuit, an LTE circuit, and a WCDMA circuit. These circuits may be separately disposed, or may share a portion.

The radio frequency communications circuit includes an antenna structure, and the antenna structure may be partially or completely formed by a portion of a conductive frame of the communications terminal 100. With reference to FIG. 2, the conductive frame may use the side frame 130 of the communications terminal 100, and alternatively may be located at the front or the back of the communications terminal 100. For example, for a communications terminal that includes a screen, a conductive frame of the communications terminal may use a metallic portion of an edge of the screen. The antenna structure may alternatively be partially disposed inside the communications terminal 100, for example, disposed above a printed circuit board, or disposed on a surface of a dielectric support.

Figure 3:
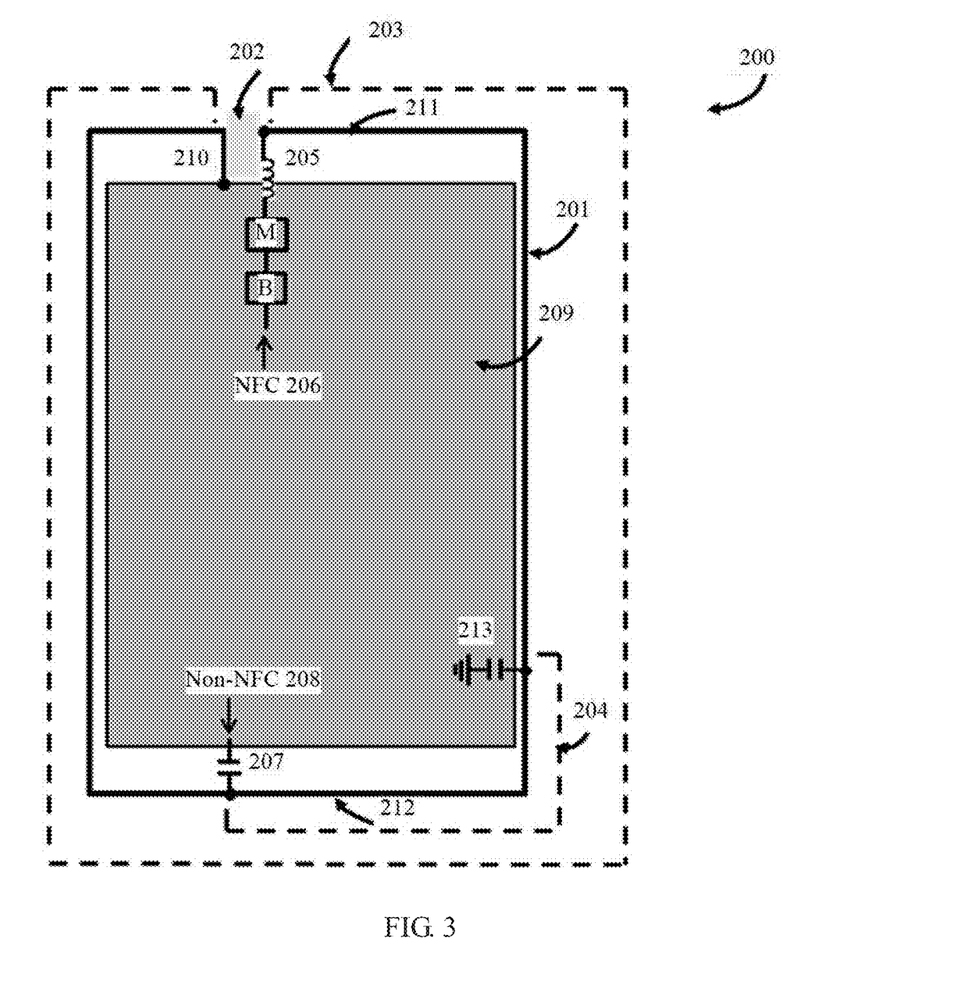
FIG. 3 is a schematic diagram of an antenna structure according to an embodiment of the present invention.

With reference to FIG. 2, FIG. 3 shows a schematic diagram of an antenna structure 200, applied to the communications terminal 100, according to an embodiment of the present invention. The communications terminal 100 includes a metallic frame 201, the metallic frame 201 includes at least one slot 202, and the antenna structure 200 includes:
  a near field communication NFC antenna 203 and a non-NFC antenna 204, where the NFC antenna 204 includes an NFC radiator 211, a first filtering unit 205, and an NFC circuit 206, and the non-NFC antenna 204 includes a non-NFC radiator 212, a second filtering unit 207, and a non-NFC circuit 208;
  the NFC radiator 211 and the non-NFC radiator 212 are formed by the metallic frame 201 of the communications terminal 100, and the entire non-NFC radiator 212 is in the NFC radiator 211; and
  the NFC circuit 206 is coupled to the NFC radiator 211 by using the first filtering unit 205, the non-NFC circuit 208 is coupled to the non-NFC radiator 212 by using the second filtering unit 207, the first filtering unit 205 is configured to filter out a non-NFC signal generated by the non-NFC circuit 207, and the second filtering unit 207 is configured to filter out an NFC signal generated by the NFC circuit 206.

Figure 4:
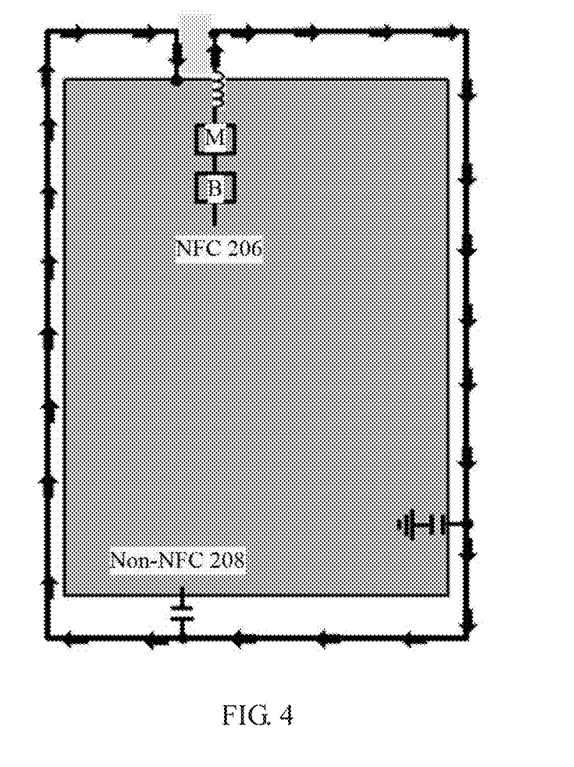
FIG. 4 is a schematic diagram of a current path of an NFC antenna according to an embodiment of the present invention.

With reference to a current path of an NFC antenna shown in FIG. 4, the current path of the NFC antenna makes full use of a border of a communications terminal to significantly increase a magnetic flux generated by the NFC antenna. Therefore, by using the antenna structure provided by this embodiment of the present invention, NFC performance of the communications terminal is improved.

The at least one slot 202 is provided at a top, a bottom, or a side frame of the communications terminal 100.

The NFC circuit 206 is configured to generate an NFC signal, and the NFC circuit 206 includes a matching circuit M or a balun circuit B. The matching circuit M is configured to adjust input impedance of the NFC antenna to improve transmission performance of the NFC antenna. The matching circuit includes a combination of a capacitor and/or an inductor and the like. The balun circuit B is configured to convert an NFC double-end signal into a single-end signal.

The first filtering unit 205 includes an inductor or a low-pass circuit. The low-pass circuit indicates that an NFC signal is in a passed state when passing through the first filtering unit 205, and that a non-NFC signal with a frequency higher than a frequency corresponding to the NFC signal is blocked from passing through the first filtering unit 205.

The NFC antenna 203 includes a grounding point 210, the grounding point 210 is conducted with ground on a printed circuit board 209, and the grounding point 210 and the NFC circuit 206 form a single-end feeding mode. Because persons skilled in the art are familiar with various manners of setting ground on the printed circuit board 209, details are not described herein. The grounding point 210 is electrically connected to the metallic frame 201 by using a conductor, a metal spring, a flexible circuit board, or the like.

The NFC circuit 206 is disposed on the printed circuit board 209, and is coupled to the metallic frame 201 by using the first filtering unit 205. A position at Which the first filtering unit 205 is coupled to the metallic frame 201 is a first coupling point, and a continuous section from the first coupling point to the grounding point 210 constitutes the NFC radiator 211.

Figure 5:
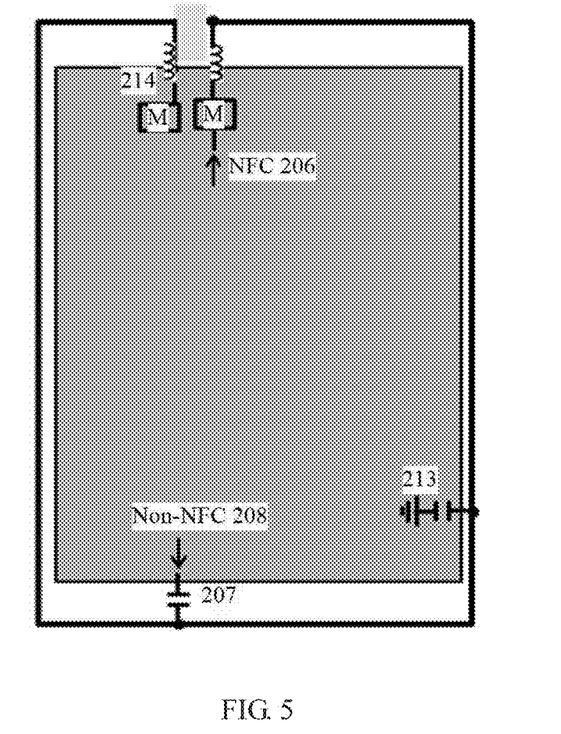
FIG. 5 is a schematic diagram of an antenna structure according to an embodiment of the present invention.

Alternatively, with reference to FIG. 5, the NFC antenna 203 includes a second feeding circuit 214, and the second feeding circuit 214 and the NFC circuit 206 form a double-end feeding mode. A continuous section from the first coupling point to a position at which the second feeding circuit 214 is coupled to the metallic frame 201 constitutes the NFC radiator 211. The second feeding circuit 210 includes an inductor or a low-pass circuit. The low-pass circuit indicates that an NFC signal is in a passed state when passing through the low-pass circuit, and that a non-NFC signal with a frequency higher than a frequency corresponding to the NFC signal is blocked from passing through the low-pass circuit. The second feeding circuit 210 further includes a matching circuit, and the matching circuit includes a combination of a capacitor and/or an inductor and the like.

The second filtering unit 207 includes an inductor or a high-pass circuit. The high-pass circuit indicates that a non-NFC signal is in a passed state when passing through the second filtering unit 207, and that an NFC signal with a frequency lower than a frequency corresponding to the non-NFC signal is blocked from passing through the second filtering unit 207. Optionally, a capacitance value of the capacitor is greater than 30 picofarads.

The non-NFC antenna 20 includes a grounding path 213, one end of the grounding path 213 is connected to the ground on the printed circuit board 209, and the other end of the grounding path 213 is electrically connected to the metallic frame 201 by using a conductor, a metal spring, a flexible circuit board, or the like. The grounding path 213 includes a capacitor or a high-pass circuit. The high-pass circuit indicates that a non-NFC signal is in a passed state when passing through the grounding path 213, and that an NFC signal with a frequency lower than a frequency corresponding to the non-NFC signal is blocked from passing through the grounding path 213.

The non-NFC circuit 208 is disposed on the printed circuit board 209, and is coupled to the metallic frame 201 by using the second filtering unit 207. A position at which the second filtering unit 207 is coupled to the metallic frame 201 is a second coupling point, and a continuous section from the second coupling point to the grounding path 213 constitutes the non-NFC radiator 212.

A length of the non-NFC radiator 212 is less than one-fourth of a length of the NFC radiator 211.

The length of the NFC radiator 211 is greater than one-fourth of a length of the metallic frame 201.

Figure 6:
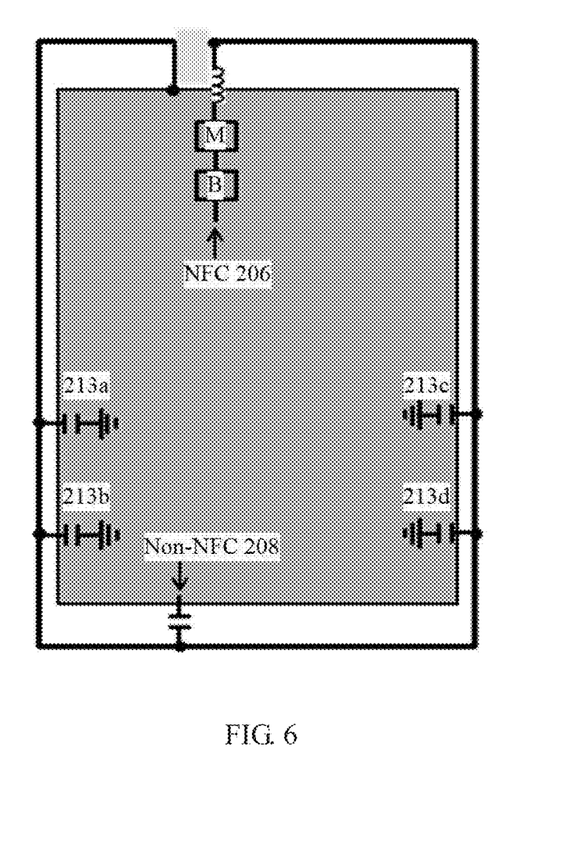
FIG. 6 is a schematic diagram of an antenna structure according to an embodiment of the present invention.

With reference to FIG. 6, in order to reduce spurious waves, the antenna structure 200 includes a plurality of grounding paths 213. FIG. 6 shows a case of four grounding paths 213a, 213b, 213c, and 213d. A specific quantity and position are not limited hereto.

Figure 7:
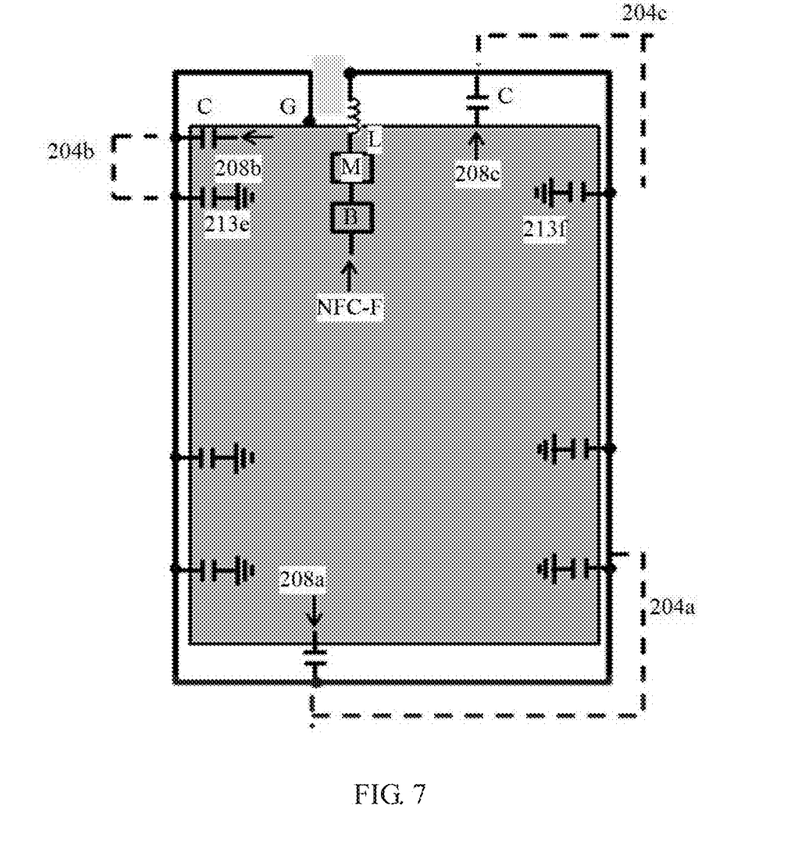
FIG. 7 is a schematic diagram of an antenna structure according to an embodiment of the present invention.

With reference to FIG. 7, to increase a share rate of an NFC antenna and another non-NFC antenna, the antenna structure 200 includes a plurality of non-NFC antennas. FIG. 7 shows a case of three non-NFC antennas 204a, 204b, and 204c. A specific quantity and position are not limited hereto. The non-NFC antenna includes a primary antenna, a diversity antenna, a GPS antenna, a Wi-Fi antenna, or the like.

To adapt to a product exterior design requirement, two slots are provided on the metallic frame 201 of the communications terminal 100. The two slots divide the metallic frame 201 into a first portion and a second portion, and a length of the first portion is greater than a length of the second portion. The NFC circuit 206 is coupled to the first portion by using the first filtering unit 205, and the first portion is used to form the NFC radiator 211.

When three slots are provided on the metallic frame 201 of the communications terminal 100, the three slots divide the metallic frame 201 into a first portion, a second portion, and a third portion. A length of the first portion is greater than a length of the second portion, and the length of the first portion is also greater than a length of the third portion. The NFC circuit 206 is coupled to the first portion by using the first filtering unit 205, and the first portion is used to form the NFC radiator 211. By analogy, when a plurality of slots are provided on the metallic frame 201 of the communications terminal 100, and the plurality of slots divide the metallic frame 201 into a plurality of portions, the NFC circuit 206 is always coupled to a longest portion of the plurality of portions by using the first filtering unit 205, and the longest portion is used to form the NFC radiator 211. It can be understood that, the non-NFC radiator 212 that shares with the NFC radiator 211 is located at this portion, while other independent non-NFC radiators may be disposed at other portions of the plurality of portions.

With reference to the foregoing accompanying drawings, an embodiment of the present invention further provides the communications terminal 100, and the communications terminal 100 includes the printed circuit board 209 disposed in the communications terminal, and the antenna structure 200.

The communications terminal 100 further includes a metallic front housing, and the metallic front housing acts as the ground wire and is connected to the grounding point of the NFC antenna.

The communications terminal 100 further includes a battery cover (not shown in the figures). The battery cover is a non-metallic battery cover, and the non-metallic battery cover is connected to the metallic frame. Alternatively, the battery cover is a metallic battery cover, and the metallic battery cover is partially connected to the metallic frame, but there is a non-metallic substance layer between the metallic battery cover and the NFC radiator portion of the metallic frame.

By using the antenna structure provided by this embodiment of the present invention, NFC performance of the communications terminal is improved.

It should be noted that, in all the embodiments of the present invention, unless otherwise specified, "greater than" shall be construed as including "greater than or equal to", "less than" shall be construed as including "less than or equal to", and both "above" and "below" shall be construed as including a number itself.

It should be noted that, in all the embodiments of the present invention, unless otherwise specified, a number range shall be construed as including a first number and a last number. For example, 700 MHz-960 MHz includes 700 MHz, 960 MHz, and all frequencies in between, and 800 MHz to 2100 MHz includes 800 MHz, 2100 MHz, and all frequencies in between.

It should be noted that, in all the embodiments of the present invention, a term "ground" may be replaced by such a term as an "antenna grounding portion", an "antenna around", a "ground plane", or the like. They are used to indicate a basically same meaning. The ground is connected to a ground wire of a radio frequency transceiver circuit, and the antenna grounding portion has a wavelength longer than an operating wavelength of the antenna. Optionally, the antenna grounding portion may be mainly disposed on a surface of the printed circuit board of the communications terminal. An electrical connector such as a spring, a screw, a spring, a conductive fabric, a conductive foam, or a conductive adhesive may be further disposed on the printed circuit board, to establish a connection between the radio frequency circuit and the antenna, or to establish a connection between the antenna grounding portion and the antenna. In addition, air, plastic, ceramics, or another dielectric material may be filled between the antenna and the antenna grounding portion.

It should be noted that, the frequency mentioned in the embodiments of the present invention may be construed as a resonance frequency. For persons of ordinary skill in the art, a frequency within a range of 7%-13% of a resonance frequency may be understood as an operating bandwidth of the antenna. For example, the resonance frequency of the antenna is 1800 MHz, and the operating bandwidth is 10% of the resonance frequency, then a range of the operating frequency of the antenna is 1620 MHz-1980 MHz.

It should be noted that, the capacitor and the inductor mentioned in the foregoing embodiments may be a lumped capacitor and a lumped inductor, or may be a capacitor component and an inductor component, or may be a distributed capacitor and a distributed inductor. This is not limited in this embodiment of the present invention.

It should be noted that, ordinal numbers such as "first", "second", and "third" mentioned in all the embodiments of the present invention shall be understood as to serve a purpose of distinguishing only, unless they definitely express the meaning of order according to a context.

What is claimed is:

1. An antenna structure for use in a communications terminal that comprises a metallic frame, wherein the antenna structure comprises:
    a non-near field communication (NFC) antenna comprising:
        a non-NFC radiator formed by the metallic frame;
        a non-NFC filter; and
        a non-NFC circuit coupled to the non-NFC radiator using the non-NFC filter; and
    an NFC antenna coupled to the non-NFC antenna, wherein the NFC antenna comprises:
        an NFC radiator formed by the metallic frame, wherein the non-NFC radiator is entirely disposed within the NFC radiator such that two ends of the non-NFC radiator are coupled to the NFC radiator;
        an NFC filter; and
        an NFC circuit coupled to the NFC radiator using the NFC filter,
    wherein the NFC filter is configured to filter out a non-NFC signal generated by the non-NFC circuit, and wherein the non-NFC filter is configured to filter out an NFC signal generated by the NFC circuit.

2. The antenna structure of claim 1, wherein the non-NFC antenna comprises a grounding path, wherein one end of the grounding path is connected to ground, wherein the other end of the grounding path is electrically connected to the metallic frame, and wherein the grounding path comprises a capacitor or a high-pass circuit.

3. The antenna structure of claim 2, wherein the capacitor has a capacitance value greater than thirty picofarads.

4. The antenna structure of claim 1, wherein a length of the non-NFC radiator is less than one-fourth of a length of the NFC radiator.

5. The antenna structure of claim 1, wherein a length of the NFC radiator is greater than one-fourth of a length of the metallic frame.

6. The antenna structure of claim 1, wherein the NFC antenna comprises a grounding point, and wherein the grounding point and the NFC circuit form a single-end feeding mode.

7. The antenna structure of claim 1, wherein the NFC circuit comprises a balun circuit.

8. The antenna structure of claim 1, wherein the NFC antenna further comprises a second feeding circuit, and wherein the second feeding circuit and the NFC circuit form a double-end feeding mode.

9. The antenna structure of claim 1, wherein the NFC antenna further comprises an NFC matching circuit configured to adjust impedance, and wherein the NFC matching circuit is connected in series between the NFC circuit and the NFC filter.

10. The antenna structure of claim 1, wherein the NFC filter is an inductor or a low-pass circuit, and wherein the non-NFC filter is a capacitor or a high-pass circuit.

11. The antenna structure of claim 1, wherein the non-NFC antenna comprises a primary antenna, a diversity antenna, a global positioning system (GPS) antenna, or a wireless fidelity (Wi-Fi) antenna.

12. A communications terminal, comprising:
    a metallic frame;
    a printed circuit board disposed in the communications terminal; and
    an antenna structure coupled to the printed circuit board and comprising:
        a non-near field communications (NFC) antenna comprising:
            a non-NFC radiator formed by the metallic frame;
            a non-NFC filter; and
            a non-NFC circuit coupled to the non-NFC radiator using the non-NFC filter; and
        an NFC antenna comprising:
            an NFC radiator formed by the metallic frame, wherein the non-NFC radiator is entirely disposed within the NFC radiator such that two ends of the non-NFC radiator are coupled to the NFC radiator;
            an NFC filter and
            an NFC circuit coupled to the NFC radiator using the NFC filter,
        wherein the NFC filter is configured to filter out a non-NFC signal generated by the non-NFC circuit, and wherein the non-NFC filter is configured to filter out an NFC signal generated by the NFC circuit.

13. The communications terminal of claim 12, wherein the communications terminal further comprises a metallic front housing that serves as a ground wire and that is connected to a grounding point of the NFC antenna.

14. The communications terminal of claim 12, wherein the metallic frame comprises at least one slot.

15. The communications terminal of claim 14, wherein the communications terminal further comprises a non-metallic battery cover coupled to the metallic frame.

16. The communications terminal of claim 14, wherein the non-NFC antenna further comprises a grounding path, wherein one end of the grounding path is coupled to ground and the other end of the grounding path is electrically coupled to the metallic frame, and wherein the grounding path comprises a capacitor or a high-pass circuit.

17. The communications terminal of claim 16, wherein the capacitor has a capacitance value greater than thirty picofarads.

18. The communications terminal of claim 14, wherein a length of the non-NFC radiator is less than one-fourth of a length of the NFC radiator.

19. The communications terminal of claim 14, wherein a length of the NFC radiator is greater than one-fourth of a length of the metallic frame.

20. The communications terminal of claim 14, wherein the NFC antenna further comprises an NFC matching circuit configured to adjust impedance, wherein the NFC matching circuit is coupled in series between the NFC circuit and the NFC filter.

* * * * *